United States Patent

Park et al.

Patent Number: 6,006,082
Date of Patent: Dec. 21, 1999

[54] FM DEMODULATING DEVICE USING AN EXTENDED KALMAN FILTER

[75] Inventors: Seung-Keun Park; Young-Hwan Lee; Jin-Dam Mok, all of Daejeon, Rep. of Korea

[73] Assignee: Electronics and Telecommunications Research Institute, Daejeon, Rep. of Korea

[21] Appl. No.: 08/904,624

[22] Filed: Aug. 1, 1997

[30] Foreign Application Priority Data

Nov. 25, 1996 [KR] Rep. of Korea ...................... 96-57100

[51] Int. Cl.⁶ ..................................................... H04B 1/38
[52] U.S. Cl. ......................... 455/337; 455/307; 455/309
[58] Field of Search ................................... 375/243, 254, 375/284, 285, 346, 350, 340; 455/337, 309, 308, 307, 214; 329/315, 318, 319, 320

[56] References Cited

U.S. PATENT DOCUMENTS

| | | | |
|---|---|---|---|
| 3,984,634 | 10/1976 | Painter | 455/303 |
| 5,303,269 | 4/1994 | Altes | 375/348 |
| 5,832,046 | 7/1996 | Li et al. | 375/355 |

*Primary Examiner*—Wellington Chin
*Assistant Examiner*—Congvan Tran
*Attorney, Agent, or Firm*—Jacobson, Price, Holman & Stern, PLLC

[57] ABSTRACT

This invention provides an FM demodulating device for robustly demodulating a received FM signal even under a jammed communication condition through the use of an improved extended Kalman filtering scheme, which is applied to the FM communication system exhibiting a random occurrence of cochannel. The device includes a memory for providing scale factors stored therein at an appropriate time, an observation determining unit for analyzing the reliability of the received signal based upon error computation results and scale factors to determine whether or not the received signal contains an interfering signal, and for correcting the received signal, a state predictor predicting states for the corrected observations, a state estimator receiving the error computation results, for producing the calculations performed for the state estimation, and an error computing unit receiving the predicted states from the state predicting means, for calculating the errors, and then outputting the calculated errors to the observation determining unit and state estimator.

8 Claims, 1 Drawing Sheet

FM DEMODULATING DEVICE USING AN EXTENDED KALMAN FILTER

BACKGROUND OF THE INVENTION

1. Field of the Invention

The present invention relates to an FM (frequency) modulation) demodulating device which ensures to robustly demodulate a received FM signal even under a jammed communication condition through the use of an improved extended Kalman filtering scheme which is applied to the FM communication system exhibiting random occurrences of a cochannel.

2. Description of the Conventional Art

In general, a communication system may receive the desired significant signal, linearly with unwanted interfering and noise signals. In particular, a stronger power of the interfering signal relative of the information signal makes it difficult to communicate with much satisfaction. Under a military-purpose communication, a jammer is often used in transmitting signals of frequencies selected at random so as to disturb radio channels of an opponent and thus the communications thereof. In addition, a cochannel interference founded in a commercial or military communication randomly occurs, which acts as a cause of a disturbance of communication.

To this end, a conventional communication system employs two phase-locked loops to overcome those problems, whose purposes are to track the desired and interfering signals, respectively.

The signals modeled as represented in the following equation (1) are applied to an extended Kalman filter (EKM) from which the states of the phase, frequency and amplitude are estimated:

$$Y(t) = S_d(t) + S_i(t) + n(t) \tag{1}$$

where Y(t) denotes observations, $S_d(t)$ the desired signal, n(t) noise, and $S_i(t)$ interfering signals, respectively.

There has been a problem in that due to the random occurrence of the cochannel phenomenon the communication in a better condition cannot be attained, resulting in the quality of the communication being greatly reduced.

SUMMARY OF THE INVENTION

Accordingly, it is an object of the present invention to provide an FM demodulating device robustly demodulating a received FM signal even under a jammed communication condition through the use of an improved extended Kalman filtering scheme applied to the FM communication system exhibiting a random occurrence of a cochannel.

To achieve the above objects, there is provided an FM demodulating device employing an extended Kalman scheme which robustly enables FM demodulation even under a jammed communication condition, the device comprising: memory means for providing scale factors previously stored therein, at an appropriate time; observation determining means which receives an input signal, analyzes the reliability of the received signal by using error computation results and by referring to the scale factors retrieved from the memory means, determines whether or not the received signal contains an unwanted interfering signal therein, and then corrects the received signal as desired; state predicting means for receiving the corrected observations from the observation determining means and then for predicting states; state estimating means for receiving the error computation results and for producing the calculations performed for the state estimation; and error computing means which receives the predicted states from the state predicting means, calculates the errors, and then outputs the calculated errors to the observation determining means and state estimating means.

BRIEF DESCRIPTION OF THE DRAWINGS

The present invention will become more fully understood from the following detailed description taken in conjunction with the accompanying drawings, wherein.

DETAILED DESCRIPTION OF THE INVENTION

Figure 1:
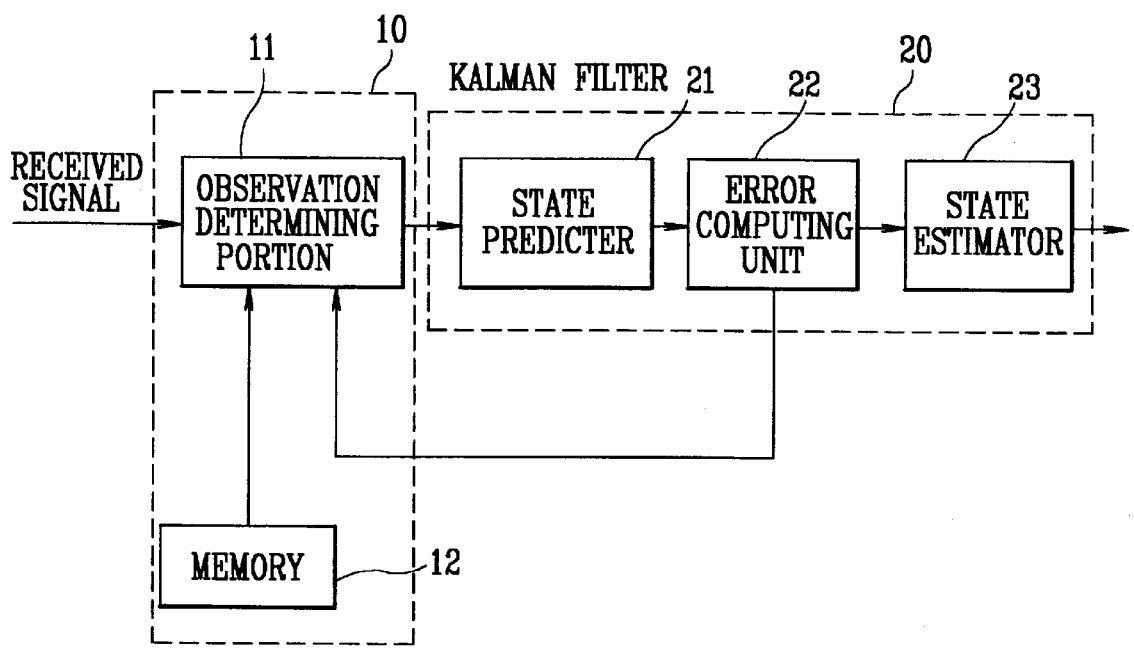
FIG. 1 is a structural diagram of an extended Kalman filter proposed in the present invention.

A substantial commercial- or military-purpose communication system strongly requires the consideration of a model in which an interfering signal occurs at random. Since such a model assumes that the interfering signal always exists, this model is substantially not suitable for an actual communication environment.

In conventional systems using phase-locked loops, one must know in advance an amplitude of a signal, but a Kalman filter does not require any information assumed concerning the amplitude. These facts make it possible to model the received signal as represented in an equation (2) below. The desired signal may be recovered through FM demodulation to which, according to the present invention, an improved and extended Kalman filter (EKF) based upon a Gaussian distribution of the residue is applied for the purpose of the signal measurement.

$$Y(t) = S_d(t) + \Omega S_i(t) + n(t) \tag{2}$$

where $\Omega \in \{0, 1\}$ represents a binary random variable.

The FM system model using the improved EKF is represented by the following mathematical equation (3).

$$\frac{d X(t)}{dt} = FX(t) + GW(t) \tag{3}$$
$$Y(t) = h[X(t)] + V(t)$$

where X(t) represents state variable, W(t) a state noise with white Gaussian distribution, Y(t) observation variable, h[X(t)] nonlinear function, and V(t) observation noise with covariance R and white Gaussian distribution.

The following equation (4) represents the detailed mathematical model for the above nonlinear function h[X(t)].

$$h[X(t)] = a\sqrt{2} \sin(\omega_c t + \Theta(t)) \tag{4}$$
$$\text{where, } \Theta(t) = c \int_0^t s(v) dv$$
$$X(t) := [\Theta s a]$$

In the above equation (4), s is defined by the first-order differential equation (5) as follows:

$$\frac{ds(t)}{dt} + \alpha s(t) = \sqrt{2}\,\omega(t) \qquad (5)$$

Conversion of the above equation (5) into the difference equation gives the following equation (6).

$$X_k = \Theta X_{k-1} + W_{k-1} \qquad (6)$$

where the subscript k represents the number of sampling times at t=kT, and T represents a sampling interval.

Covariance of $\Phi$ is given by the following matrix expression (7):

$$\Phi = \begin{pmatrix} 1 & \Phi_{12} & 0 \\ 0 & \Phi_{22} & 0 \\ 0 & 0 & 1 \end{pmatrix} \qquad (7)$$

$$\text{where, } \Phi_{12} = \frac{c}{\alpha}[1 - \exp(-\alpha T)]$$

$$\Phi_{22} = \exp(-\alpha T)$$

Covariance of W is given by the following matrix expression (8):

$$W = \begin{pmatrix} \omega_{11} & \omega_{12} & 0 \\ \omega_{21} & \omega_{22} & 0 \\ 0 & 0 & 0 \end{pmatrix} \qquad (8)$$

$$\text{where, } w_{11} = \frac{c^2}{\alpha^2}[2\alpha T + 4\exp(-\alpha T) - \exp(-2\alpha T) - 3]$$

$$w_{11} = \frac{c}{\alpha}[1 - \exp(-\alpha T)]^2$$

$$w_{11} = 1 - \exp(-2\alpha T)$$

Computational procedures for the extended Kalman filter associated with the current model are given by a set of the following equations (9).

$$X_{k/k-1}^{mean} = \Phi X_{(k-1)/(k-1)}^{mean} \qquad (9)$$

$$P_{k/(k-1)} = \Phi P_{(k-1)/(k-1)} \Phi^T + W$$

$$e_k = Y_k - h(X_{k/(k-1)}^{mean})$$

$$Pe_{k/(k-1)} = H(X_{k/(k-1)}^{mean})P_{k/(k-1)}H^T(X_{k/(k-1)}^{mean}) + R$$

$$K_k = H(X_{k/(k-1)}^{mean})P_{k/(k-1)}Pe_{k/(k-1)}^{-1}$$

$$X_{k/k}^{mean} = X_{k/(k-1)}^{mean} + K_k e_k$$

$$P_{k/k} = P_{k/(k-1)} - K_k H(X_{k/(k-1)}^{mean})P_{k/(k-1)}$$

$$\text{where, } Y^{k-1} = \{y_0, y_1, \ldots, y_{k-1}\}$$

$$X_{(k-1/k-1)}^{mean} := E\left[\frac{X_{k-1}}{Y^{k-1}}\right]$$

$$P_{k/(k-1)} = E\left[\frac{(X_k - X_{(k/k-1)}^{mean})(X_k - X_{(k/k-1)}^{mean})^T}{Y^k}\right]$$

$$H(X_{k/(k-1)}^{mean}) := \left[\frac{dh(X_k)}{dX_k}\right]_{X_k = X_{k/(k-1)}^{mean}}$$

In the computational procedures, a more concrete analysis for the equation, $$X_{k/k}^{mean} = X_{k/k-1}^{mean} + K_k e_k$$

provides some of the advantages in that if $K_k$ representing the weight of residue becomes small enough to reach zero, $$X_{k/k}^{mean}$$

and $$X_{k/k-1}^{mean}$$

become identical to each other. This makes the meaningful role of residue insignificant, which thus allows the observations in the EKF to be dispensable in the computational procedures. The gist of this invention is to propose an improved EKF using the above-described features.

Since the observation noise has a Gaussian distribution, the residue, $$e_k = Y_k - h(X_{k/(k-1)}^{mean})$$

also has a Gaussian distribution. The Gaussian distribution being determined depending upon an average and covariance, the residue has the average of zero and the covariance of $Pe_{k/(k-1)}$. The following equation (10) may be considered when lots of residues over the time occur.

$$3\sqrt{Pe_{k/(k-1)}} < |e_k| \qquad (10)$$

A functional feature as seen from the above equation (10) is to discriminate observations outside an area of the Gaussian distribution for the residue. Namely, if an absolute magnitude for the residue is larger than three times the standard deviation, the near zero-valued Gaussian function for the residue would be obtained. Therefore, FM observations containing the interfering signals can be excluded from the estimation algorithm in which the state estimates are made except for the observations outside the area of the residue distribution. Exclusion of the observations from the estimation procedures allows $$X_{k/k}^{mean}$$

to be treated as $$X_{k/(k-1)}^{mean}.$$

In other words, the weight of the residue is regarded as zero.

Squaring both sides of the above equation (10) yields the following equation (11).

$$3^2 Pe_{k/(k-1)} < e_k^2 \qquad (11)$$

If the above equation (11) is expressed in a more general form, the result is as follows:

$$m^2 Pe_{k/(k-1)} < e_k^2 \qquad (12)$$

Here, m in the above equation (12) is referred to as a scale factor. Depending upon the magnitude of the scale factor, the observations included in the estimation procedures are varied. The larger the scale factor is, the wider the range of observations that results in the area of the distribution. The magnitudes of the scale factor will be different for each model to which the EKF is applied. Accordingly, the present invention applying the Gaussian distribution for the residue to the existing EKF, so as to estimate the desired significant signal from the input signal containing the interfering signal, includes estimating the reliability of the observations, and excluding observations lacking the reliability in the decision step from the estimation procedures. More specifically, the present invention assumes the residue as being of the Gaussian distribution having an average and covariance obtained from the EKF, and defines, based upon the square root taken for the scale factor and covariance, the reliable observation range, whereby any signals outside said range are regarded as unwanted interfering signals to be excluded in the estimation procedures.

One example representative of the preferred embodiments according to the present invention will now be described in detail in accordance with the accompanying drawings.

FIG. 1 is a structural diagram of an EKF proposed in the present invention.

FM demodulating device using the EKF as proposed in the present preferred embodiment includes an observation determining unit 10 and an extended Kalman filtering (EKF) unit 20 conventionally used. The observation determining unit 10 analyzes, based upon the aforementioned equation (12), the reliability of a signal input to the present demodulator, and determines whether or not the received signal contains an unwanted interfering signal so as to know if the EKF is to be applied.

The observation determining unit 10 consists of an observation determining portion 11 and a memory unit 12. The observation determining portion 11 is operated to receive the input signal and correct the received signal by using error computation results feedback from the EKF unit 20 and referring to the scale factor retrieved from the memory 12. This memory 12 is used to provide the scale factors stored therein to the observation determining portion 11 at an appropriate time. Upon receiving the significant observations from the observation determining unit 10, the EKF estimates the related states through a state predictor 21, an error calculator 22, and a state estimator 23 which form the EKF. The state predictor 21 receives the corrected observations from the observation determining portion 11, and predicts the states. The error computing unit 22 receives the predicted states, calculates the error, and then outputs the error to both the state estimator 23 and the observation determining unit 10. The state estimator 23 receives the error from the error computing unit 22, estimates the states, and then outputs them.

Figure 2:
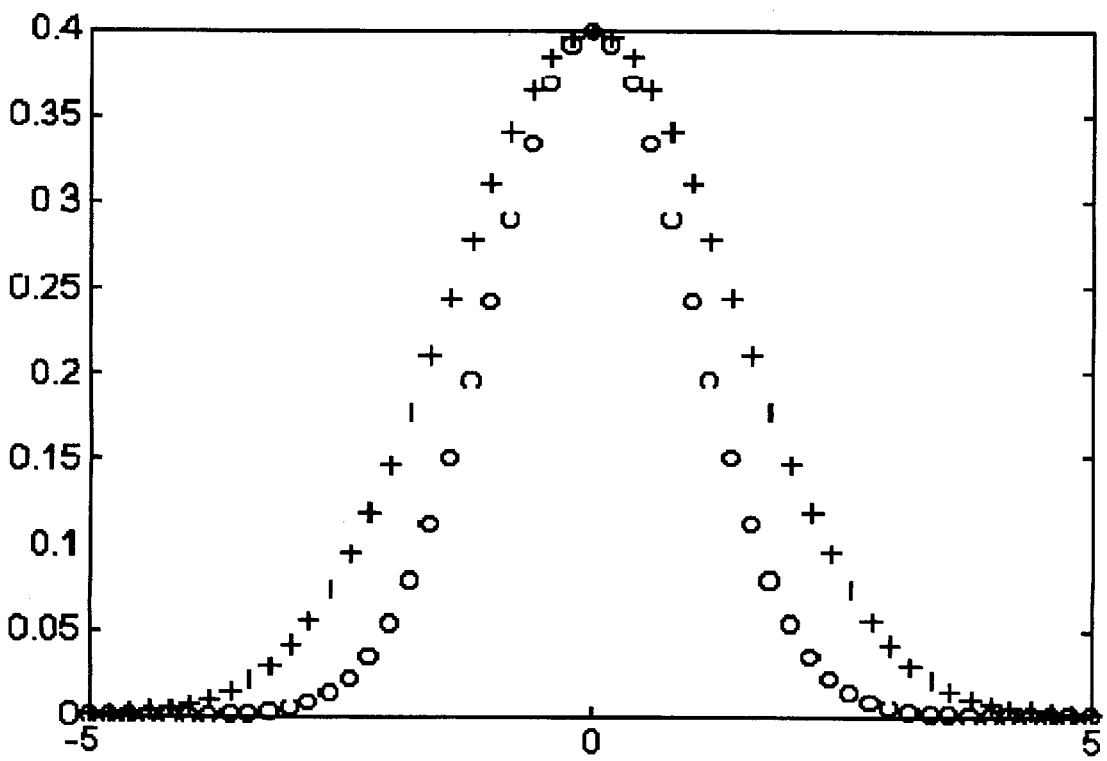
FIG. 2 graphically shows various Gaussian distributions for a residue which are used in determining the reliability for observations.

FIG. 2 shows the Gaussian distribution for the residue which is used in determining the reliability of the observations. This drawing exhibits the different shapes of the residue's Gaussian distribution varied with the different scale factors, wherein the larger the scale factor is, the wider the area of the distribution that is obtained, this resulting in the inclusion of more observations.

As described above, the present invention provides advantages in that in demodulating the received signal, only the effective observations are selected based upon the observation reliability through the use of the observation determining scheme, unreliable other observations being discarded from the estimation procedures, whereby only the desired significant signals are estimated from the received signal containing the interfering signals and a good quality communication can thus be accomplished.

What is claimed is:

1. A FM demodulating device employing an extended Kalman filter which robustly enables FM demodulation even under a jammed communication condition, the device comprising:

memory means for providing scale factors previously stored therein at an appropriate time;

an observation determining portion which receives an input signal, analyzes a reliability of the received signal by using error computation results and by referring to the scale factors retrieved from the memory means, determines whether or not the received signal contains an unwanted interfering signal therein, and then corrects the received signal to exclude observations containing the interfering signal by discriminating observations outside an area of a Gaussian distribution for a residue;

state predicting means for receiving the corrected signal from the observation determining portion and then predicting states;

state estimating means for receiving the error computation results and producing calculations performed for a state estimation; and error computing means which receives the predicted states from the state predicting means, calculates errors, and then outputs the error computation results to the observation determining portion and the state estimating means.

2. A FM demodulating device employing an extended Kalman filter for robust demodulation in an FM communication system exhibiting random occurrences of a cochannel, comprising:

an observation determining unit having a memory for providing scale factors previously stored therein, said observation determining unit receiving an input signal, determining through use of error computation results and a scale factor a reliability of the input signal based on existence of an interfering signal within the input signal, and correcting the input signal to exclude FM observations that include the interfering signal; and an extended Kalman filter including, a state predictor for receiving the corrected input signal from the observation determining unit and then predicting states;

a state estimator for receiving the error computation results and calculating state estimates using an estimation algorithm; and an error computing unit for receiving the predicted states from the state predictor, calculating errors, and then outputting the error computation results to the observation determining unit and the state estimator.

3. The FM demodulating device as set forth in claim 2 wherein the reliability of the input signal is determined using a Gaussian distribution for a residue such that FM observations containing the interfering signal are excluded from the estimation algorithm, allowing a weight of the residue to be regarded as zero.

4. The FM demodulating device as set forth in claim 2 wherein the reliability of the input signal is determined using a Gaussian distribution for a residue, and wherein an increase in the scale factor widens an area of the Gaussian distribution such that a number of observations included therein is increased.

5. The FM demodulating device as set forth in claim 3 wherein said Gaussian distribution has an average and covariance obtained from the extended Kalman filter.

6. The FM demodulating device as set forth in claim 5 wherein a reliable observation range is defined based upon a square root of the scale factor and covariance, signals outside said reliable observation range being regarded as interfering signals to be excluded from estimation procedures.

7. The FM demodulating device as set forth in claim 4 wherein said Gaussian distribution has an average and covariance obtained from the extended Kalman filter.

8. The FM demodulating device as set forth in claim 7 wherein a reliable observation range is defined based upon a square root of the scale factor and covariance, signals outside said reliable observation range being regarded as interfering signals to be excluded from estimation procedures.

* * * * *